United States Patent [19]
Borsanyi

[11] 3,818,934
[45] June 25, 1974

[54] DAMPENING UNIT FOR PULSATILE PUMP
[75] Inventor: Alexander S. Borsanyi, Irvine, Calif.
[73] Assignee: American Hospital Supply Corporation, Evanston, Ill.
[22] Filed: Mar. 9, 1973
[21] Appl. No.: 339,605

[52] U.S. Cl.................. 137/568, 128/1 R, 195/127
[51] Int. Cl............................................. A61b 19/00
[58] Field of Search........ 128/1 R, 2.05 F; 137/568, 137/563; 73/209, 198; 417/540; 195/127

[56] References Cited
UNITED STATES PATENTS
3,632,473  1/1972  Belzer et al..................... 128/402 X Primary Examiner—Carlton R. Croyle
Assistant Examiner—Richard Sher

[57] ABSTRACT

A dampening unit is provided for use in combination with a pulsatile pump, a unit which requires pulsatile flow of fluid, and a unit which requires substantially non-pulsatile flow. The dampening unit comprises a casing having an inner cavity and a pair of spaced-apart, flexible diaphragms attached to the casing within the cavity to provide a chamber between the two diaphragms. As fluid flows through the chamber, the flexible diaphragms expand and contract to dampen the pulsatile flow of the fluid. The dampening unit is connected between the pulsatile pump and the unit which requires substantially non-pulsatile flow.

4 Claims, 3 Drawing Figures

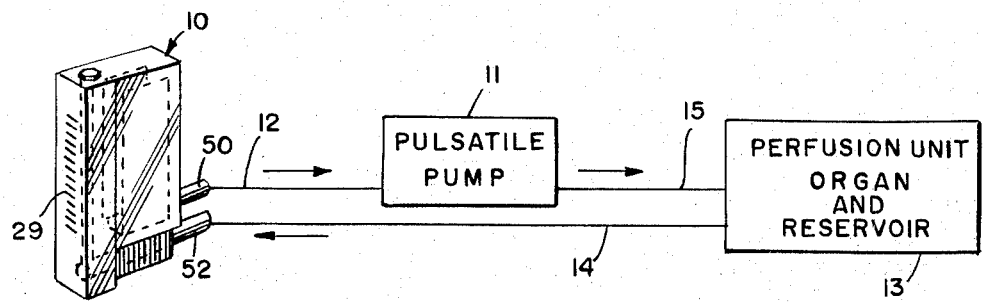
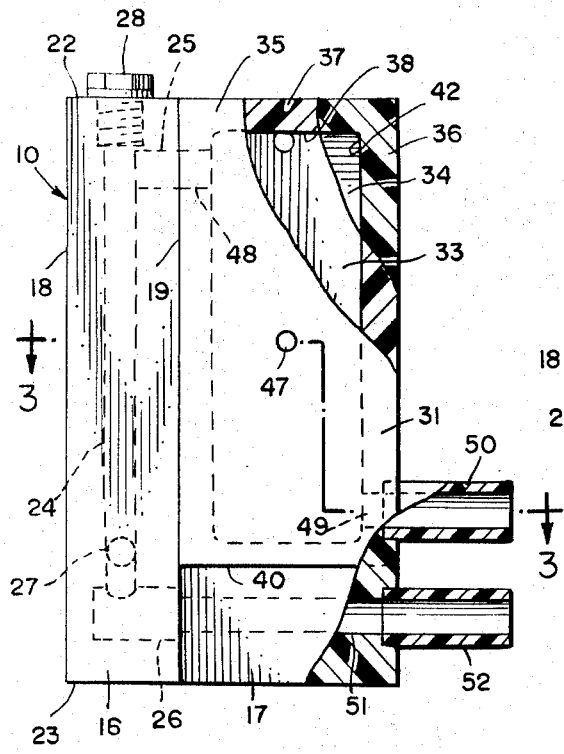
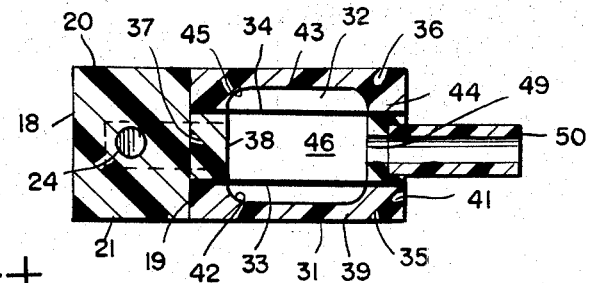

DAMPENING UNIT FOR PULSATILE PUMP

BACKGROUND

This invention relates to a dampening unit, and, more particularly, to a dampening unit which may be used in combination with a pulsatile pump, a unit which requires pulsatile flow, and a unit which requires substantially non-pulsatile flow to dampen the pulsing of the fluid flowing through the non-pulsatile unit.

It is frequently desirable to provide a pulsing or pulsatile flow of fluid. For example, in the apparatus described in U.S. Pat. No. 3,632,473, pulsatile flow of plasma is provided by a pulsatile pump to a kidney or other organ within a perfusion chamber to simulate the blood flow of the human body and to preserve the organ.

It is also desirable to measure the flow rate of the plasma which is being pumped through the organ, but it is difficult to measure the flow rate of a pulsing fluid by conventional flow meters. A commonly used flow meter for measuring the flow rate of plasma and other fluid is a rotameter which comprises a tapered tube in which a steel ball is positioned. The tube extends vertically and is provided with suitable vertically spaced flow rate indicating means. As the rate of flow of fluid through the tube increases, the ball is lifted within the tube, and the vertical position of the ball indicates the flow rate. However, if the flow is pulsatile, the ball will oscillate as the pressure of the fluid varies, and a reliable reading cannot be obtained from the rotameter.

SUMMARY

The invention provides a dampening unit which will dampen the variations in pressure of a pulsing fluid to permit the fluid to flow at a substantially constant rate through a device which requires substantially non-pulsatile flow, such as a flow meter. If the dampening unit is interposed between the pulsatile pump and the unit which requires non-pulsatile flow, the dampening unit can dampen the pulses of the fluid flowing through the non-pulsatile unit without adversely affecting the pulsatile flow through another unit in the flow circuit which requires pulsatile flow. The dampening unit includes a pair of opposed flexible diaphragms which provide substantial changes in volume of the fluid chamber within the dampening unit within a relatively small space so that substantial dampening effect can be obtained from even a small unit. However, the diaphragms are protected against excessive pressure by the side walls of the unit. The materials of the dampening unit are formed of non-thrombogenic material, and the unit provides a flow-through design to permit the unit to be used with fluids such as plasma without causing thrombosis or stagnation.

DESCRIPTION OF THE DRAWING

The invention will be explained in conjunction with an illustrative embodiment shown in the accompanying drawing, in which FIG. 1 is a perspective view of a combination flow meter and dampening unit which is connected to a fluid flow circuit;

FIG. 2 is a side elevational view, partially broken away, of the combination flow meter and dampening unit;

FIG. 3 is a sectional view taken along the line 3—3 of FIG. 2.

DESCRIPTION OF SPECIFIC EMBODIMENT

The numeral 10 designates generally a combination flow meter and dampening unit which is connected to a pulsatile pump 11 by a fluid conduit 12 and to an organ perfusion unit 13 by a conduit 14. The perfusion unit contains the organ to be perfused and a reservoir. The pulsatile pump 11 and perfusion unit 13 may be formed in accordance with U.S. Pat. No. 3,632,473, and pulsatile flow of plasma to an organ within the perfusion unit is provided by the pulsatile pump through fluid conduit 15. Although the invention will be explained in combination with a perfusion unit and a flow meter, it will be understood that the invention can be used with devices other than perfusion units which require a pulsatile flow of fluid and with devices other than flow meters which require a substantially non-pulsatile flow in order to function properly.

Referring now to FIGS. 2 and 3, the combination flow meter and dampening unit 10 comprises a flow meter 16 and a dampening unit 17, which are suitably secured together, as by adhesive. The flow meter 16 may be conventional, and the particular flow meter illustrated is formed of a solid block of transparent non-thrombogenic plastic having front and rear walls 18 and 19, side walls 20 and 21, and top and bottom walls 22 and 23. A longitudinally extending central bore 24 extends from the top wall to adjacent the bottom wall and converges or tapers inwardly slightly from top to bottom. Upper and lower transverse bores 25 and 26 extend forwardly from the rear wall of the flow meter and communicate with the longitudinal bore 24. A steel ball 27 is positioned within the longitudinal bore, and the diameter of the longitudinal bore adjacent the bottom transverse bore 26 is the same as the diameter of the ball so that the ball rests in the lower position illustrated in FIG. 2 when no fluid is flowing through the flow meter. The ball is inserted into the longitudinal bore at the upper end thereof, and the upper end of the bore is closed by a screw 28 which is threaded into the bore and provided with suitable seal means.

The direction of fluid flow through the flow meter is such that the fluid flows into the bottom transverse bore 26, upwardly through the longitudinal bore 24, and outwardly through the upper bore 25. As is well-known, the ball is raised within the longitudinal tube as fluid flows through the flow meter to a position along the tapered bore at which the force exerted on the ball by the fluid equals the weight of the ball. The vertical position of the ball is a function of the rate of flow of the fluid, and the front wall of a flow meter can be provided with index markings 29 (FIG. 1) which are calibrated to provide a reading of the flow rate.

The dampening unit 17 comprises a casing 31 which is provided with an inner cavity 32 and a pair of parallel, spaced-apart flexible diaphragms or membranes 33 and 34. The particular casing illustrated is formed from a pair of side wall portions 35 and 36 and an intermediate portion 37.

The intermediate portion 37 is generally rectangular, extends between the top and bottom walls 22 and 23 of the flow meter, and is provided with a rectangular opening 38.

The side wall portion 35 includes an outer side wall 39 which is also generally rectangular but which terminates above the bottom of the intermediate portion at 40. A perimetric rim 41 extends inwardly from the side wall 39 and defines a recess 42 which has the same periphery as the central opening 38 in the intermediate portion. The side wall portion 36 is similarly formed and includes an outer side wall 43 and an inwardly extending perimetric rim 44 which defines a recess 45.

The diaphragms 33 and 34 are formed from a sheet or film or flexible material, and in the specific embodiment illustrated, the diaphragms were formed from a film of silicone rubber having a thickness of the order of about 0.005 inch to about 0.010 inch. The membrane 33 is positioned between the perimetric rim 41 of the side cover 35 and the intermediate portion 37, and the membrane 34 is positioned between the perimetric rim 44 and the intermediate portion. The side cover portions can be secured to the intermediate portion by any suitable means, such as adhesive, sonic welding, or the like, and the diaphragms will thereby be anchored within the cavity 32 of the casing as illustrated in FIG. 3.

The diaphragms divide the cavity of the dampening unit into inner chamber 46 between the spaced-apart diaphragms and a pair of outer chambers provided between the diaphragms and the recessed portions 42 and 45 of the associated side covers 35 and 36. Each of the side walls 39 and 43 is provided with an opening 47 so that the outer chambers are maintained at atmospheric pressure.

Referring to FIG. 2, an inlet opening 48 for the chamber 46 is provided through the intermediate portion 37 of the casing in alignment with the outlet bore 25 of the flow meter, and an outlet opening 49 is provided adjacent the bottom of the chamber 46. A connecting tube 50 for the conduit 12 is secured to the intermediate portion of the casing and communicates with the outlet opening 49.

The bottom portion of the intermediate portion 37 of the casing is provided with an inlet passage 51 which is aligned with the inlet bore 26 of the flow meter, and a connecting tube 52 for the conduit 14 is secured to the intermediate portion and communicates with the passage 51.

Referring now to FIG. 1, the pulsatile pump is connected to the perfusion unit and to the combination flow meter and dampening unit 10 so that plasma flows through the conduits 12, 14 and 15 in the direction illustrated by the arrows. The perfusion unit is connected to the discharge outlet of the pump by the conduit 15, and the dampening unit is connected to the suction or intake side of the pump by the conduit 12. A pulsing flow of plasma is therefore provided to the perfused organ inside the perfusion unit.

Since the dampening unit is interposed between the outlet of the flow meter and the intake of the pulsatile pump, the pulsatile suction created in the line 12 by the pump will be dampened by the dampening unit so that the pressure at the outlet opening 25 of the flow meter will be substantially constant. As the pump draws in fluid from the conduit 12 and the pressure in this conduit and in the fluid chamber 46 of the dampening unit decreases, the flexible diaphragms 33 and 34 contract or are drawn together to reduce the volume of the chamber to maintain the pressure within the chamber substantially constant. As the pump reaches the end of its intake cycle and the suction in the line 12 decreases, the diaphragms return to their original, unflexed positions illustrated in FIG. 3. Since the pressure at the outlet 25 of the flow meter is maintained substantially constant, the flow-indicating ball 27 will be maintained in a relatively steady position, and an accurate reading can be obtained.

As stated in the aforementioned U.S. Pat. No. 3,632,473 and as well known to those in the art, the plasma flows from the organ to the reservoir of the perfusion unit. If the dampening unit is not provided in the fluid circuit, the suction of the pulsatile pump would draw the plasma out of the reservoir and through the flow meter in pulses. However, the dampening unit dampens this pulsatile suction, and the pressure of the plasma in the flow meter remains substantially constant.

The elongated fluid flow chamber 46 and the inlet and outlet openings which are positioned adjacent opposite ends of the chamber provide a flow-through design which substantially eliminates static areas within the fluid chamber and substantially eliminates the possibility that the fluid will stagnate. The dampening unit is therefore particularly suitable for use with plasma, blood, or other fluids which are subject to thrombus formation or stagnation.

The use of a pair of spaced-apart diaphragms permit relatively large variations in volume of the chamber 46 within the relatively small space of the dampening unit. Even a compact dampening unit can therefore provide dampening over a wide range of pressures.

The dampening unit can also be used on the discharge side of the pump to dampen pulses created by increasing pressure, and the dampening unit is again interposed between the pump and the non-pulsatile device so that the flow can be depulsed before it reaches the non-pulsatile device. In this case one of the openings 48 and 49 of the dampening unit would be connected to the discharge side of the pump and the other opening would be connected to the intake opening 26 of the flow meter. The outlet 25 of the flow meter would be connected to the perfusion unit or other pulsatile device. As the pump increased the pressure at the inlet opening of the dampening unit, the flexible diaphragms would expand away from each other to increase the volume of the chamber 46 and to maintain the pressure therein substantially constant. The diaphragms are protected against the possibility of rupturing under excessive pressure since they will contact the side walls before they are excessively stretched. If excessive pressure is unlikely to be encountered, the side walls could be eliminated and the sides of the dampening unit left open. It is desirable to retain the side walls, however, in order to protect the diaphragms from being punctured by external forces.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. In combination, a pulsatile pump for providing pulsatile flow of fluid, a pulsatile flow device requiring pulsatile flow of fluid connected to the pump, a non-pulsatile flow device requiring substantially non-pulsatile flow connected to the pulsatile device and to the pump to provide a continuous flow circuit, and a dampening unit interposed in the connection between the non-pulsatile flow device and the pump, the dampening unit including flexible diaphragm means in contact with the fluid flowing through the circuit which expands and contracts as the pressure of the fluid increases and decreases.

2. The structure of claim 1 in which the pump includes a suction side and a discharge side and the dampening unit comprises a casing having an inner cavity and inlet and outlet openings communicating with the inner cavity, the diaphragm means being secured to the casing within the cavity, the inlet opening of the casing being connected to the non-pulsatile flow device and the outlet opening of the casing being connected to the suction side of the pump.

3. The structure of claim 1 in which the pulsatile flow device comprises an organ perfusion unit having an organ to be perfused and a reservoir and the non-pulsatile flow device comprises a flow meter.

4. The structure of claim 2 in which the pulsatile flow device comprises an organ perfusion unit having an organ to be perfused and a reservoir and the non-pulsatile flow device comprises a flow meter.

* * * * *